Oct. 20, 1936.   W. H. MOSS   2,057,688
ELECTRICAL CONDUCTOR
Filed Nov. 27, 1931
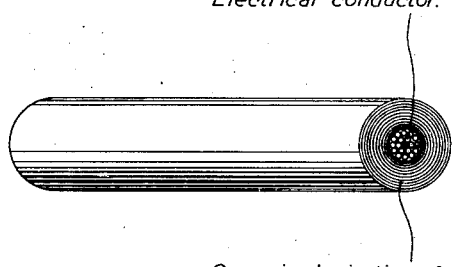
Electrical conductor.
Organic derivative of cellulose fabric impregnated with a composition containing a polymerised vinyl compound and plasticiser.
INVENTOR
William H. Moss Patented Oct. 20, 1936

2,057,688

UNITED STATES PATENT OFFICE 2,057,688

ELECTRICAL CONDUCTOR

William Henry Moss, London, England, assignor to Celanese Corporation of America, a corporation of Delaware Application November 27, 1931, Serial No. 577,699
In Great Britain December 24, 1930

11 Claims. (Cl. 173—264)

This invention relates to improvements in composite materials, and particularly in composite materials which have a high electrical resistance or a high resistance to water or humid conditions.

It is well-known that polymerized vinyl acetate and other polymerized vinyl compounds have excellent insulating properties. In my U. S. application S. No. 578,195 filed Nov. 30, 1931 corresponding to British application No. 38,955/30, I have described compositions containing polymerized vinyl compounds and the application of such compositions to tapes and fabrics of textile fibres, and also ribbons, films and the like.

I have found that composite articles containing cellulose acetate or other cellulose esters or ethers covered or impregnated with polymerized vinyl compounds constitute remarkably good electrical insulators and are valuable for many other purposes, and the present invention is concerned broadly with compositions, whether in solid, molten or dissolved form, containing polymerized vinyl compounds and containing cellulose acetate or other cellulose derivatives. For the purpose of the present invention, the cellulose acetate or other cellulose derivative should not be dispersed homogeneously through the polymerized vinyl composition, it being found that such a composition does not yield the valuable results associated with the compositions of the present invention.

The best method of producing the composite articles of the present invention consists in applying a composition containing the polymerized vinyl compound to a fabric, tape, film, ribbon, sheet, yarn, filaments or other materials made of or containing cellulose acetate or other cellulose derivative.

For the purpose of obtaining articles having a high degree of flexibility, which is of advantage in the manufacture of electric cables and other electrical conductors and also in numerous other applications, it is desirable that the polymerized vinyl composition should contain a plasticizing or softening agent, and that it should contain such agent in a substantial proportion relative to the polymerized vinyl compound, for example in a proportion of more than 10%, and preferably 20–30% or even up to 100 or 150% or more depending on the flexibility desired. For electrical insulating purposes the choice of suitable plasticizing agents is very restricted in as much as I find that the large majority of the so-called camphor substitutes, which have previously been suggested for use in conjunction with polymerized vinyl compounds, materially reduce the electrical insulating properties of the polymerized vinyl compounds, and in fact render such compounds practically useless for insulating purposes. For instance, the sulphonamide plasticizers, for example ethyl toluene sulphonamide and the isomeric xylene mono methyl sulphonamides, the tartrate plasticizers, for example dibutyl tartrate, and the phthalate plasticizers, such as diethyl phthalate, all reduce the electrical resistance properties of polymerized vinyl acetate, so that in its application to the manufacture of electric cables, they are not suitable for the purpose of the present invention. On the other hand, as disclosed in my U. S. application S. No. 578,195 filed Nov. 30, 1931, corresponding to British application No. 38,955/30, plasticizers which are phenolic bodies or esters or ethers of phenolic bodies do yield with polymerized vinyl acetate and other polymerized vinyl compounds compositions which combine a high electrical resistance with a high degree of flexibility. Hence for the purpose of the present invention in its application to electrical insulation, and particularly to the manufacture of cables and like electrical goods in which a high electrical resistance is imperative, these plasticizers are the most valuable. However, the present invention does not exclude the use of other plasticizers, since they are of value in other applications, or even in electrical insulation where the electrical requirements are not so stringent.

The plasticizer may be used in the composition in a proportion consistent with the softness or flexibility desired. In general it is not desirable to employ proportions based on the polymerized vinyl acetate or other polymerized vinyl compound of under 10%, and in fact it is better to employ proportions of 20 to 30% or even much higher, for example 50, 80, 100 or even 150% or more. In some cases, however, the proportion of plasticizer is limited by considerations of the product becoming unduly sticky. I have found that resins, either natural or artificial, may be added to the composition so as to increase the amount of plasticizer which the composition can contain without the films or other products resulting therefrom being unduly sticky. Whether or not the quantity of plasticizer is sufficient to render the composition sticky, the addition of resin to the composition may be of advantage from another aspect. It is found that certain resins, both natural and artificial, are capable of increasing the range of flexibility of the plasticized polymerized vinyl compositions used in accordance with the present invention, so that not only may the entire composition have a considerable degree of flexibility but this flexibility is maintained throughout a considerable range of temperature, which is of importance from the electrical insulation point of view. Thus for instance natural shellac added to a polymerized vinyl acetate composition increases the range of flexibility and moreover allows tricresyl phosphate, or any of the other phenolic plasticizers previously referred to, to be used in the composition to an extent up to about 150% or more on the weight of the polymerized vinyl acetate, assuming that the shellac is used in about an equal proportion to the vinyl acetate. Lower proportions of plasticizers may of course be employed, for example one hundred to one hundred and forty parts of plasticizer to one hundred parts of polymerized vinyl acetate and one hundred parts of natural shellac, the resulting product being of very high flexibility and high resistance properties. Other natural resins may be employed either for the purpose of preventing stickiness, or for the purpose of improving the flexibility range of the composition. Kauri resin is a further example, though this does not appear to be so suitable as shellac. Again synthetic resins may be employed, and for this purpose it is best to use the synthetic resins which are not liable to further condensation when heated to temperatures up to 80 or 100° C., and preferably not liable to further condensation at considerably higher temperatures. The simple phenolaldehyde synthetic resins are not so suitable for this purpose, though of course the desirability of adding them to the compositions depends to some extent upon the particular application of the compositions and the conditions to which they will be subjected in their subsequent application. The phenol-aldehyde synthetic resins obtained in presence of plasticizing agents as described below may, however, be used very satisfactorily. A highly suitable synthetic resin for the purpose of the present invention is the resin obtainable by condensation of formaldehyde with diphenylol propane or with the crude condensation product of phenol and acetone. Very useful compositions are, for example, those prepared with the aid of polymerized vinyl acetate, an equal or somewhat smaller amount down to half the quantity of diphenylol propane formaldehyde resin, and a quantity of tricresyl phosphate about equal to the quantity of diphenylol propane formaldehyde resin. Similarly the resins formed by condensation of diphenylol propane with furfural or with other aldehydes may be used, or the resinous condensation products of formaldehyde, furfural or other aldehydes with other condensation products of ketones and phenols, including the condensation products of phenols with the ketones of the cyclo paraffin series, such as cyclohexanone, cyclopentanone and the like. Again, the resinous products obtainable from phenolic bodies including the phenol itself, the cresols, the xylenols, resorcin and pyrocatechin and acetone or other aliphatic ketones or the cyclo paraffin ketones, such as cyclo hexanone may be used, and in addition the synthetic resins obtainable from furfural, benzaldehyde or other aldehydes and acetone or other ketones. Further useful synthetic resins are those produced from phenols including cresols and xylenols by condensation with chloracetone, furfural, allyl alcohol and other allyl compounds (compare U. S. application S. No. 399,880, filed 15th October, 1929), sulphur chloride, acetaldehyde, croton aldehyde, keto butanol and chloral. These resins may be hardened with formaldehyde or furfural. In addition, the synthetic resins obtainable from formaldehyde and benzene, toluene or xylene sulphonamides, the type obtainable from furfural and aniline and the resins obtainable by condensation of phenoxyacetone may be used. Moreover, any of the above resins which contain phenolic groups may be esterified or etherified, and further, the resins may if desired be halogenated.

It is not of course necessary that the complex of resin and polymerized vinyl acetate or other polymerized vinyl compound should have a higher electrical resistance than the polymerized vinyl compound itself, since for many purposes the specific electrical resistance of the polymerized vinyl compound is itself sufficient or more than sufficient and the criterion to be observed is that the resin, in common with the plasticizer used, shall not substantially reduce the specific electrical resistance or at least shall not reduce it below the value required for any specific purpose. The synthetic resins listed above are particularly valuable in that the mixture with polymerized vinyl compounds has an equal or higher electrical resistance than the polymerized vinyl compounds themselves when tested under moist conditions.

With further reference to the plasticizers and resins, it will be noted that diphenylol propane, which is obtained by condensation of acetone and phenol, may be used as plasticizer and acetone phenol resin, also obtained by condensation of acetone and phenol, may be used as resin, and similarly many other intermediate products of condensation obtained befor resin formation sets in or becomes substantial may be used as plasticizers and the corresponding resins may be added to the compositions.

Many of the synthetic resins which may be used for the compositions according to the present invention are capable of existing in an infusible insoluble state, and in this form are less suitable for the purpose of the present invention than in the form in which they are soluble. However, I have found that, if the condensation to produce the resin or at least the final stage of such condensation be carried out in presence of triphenyl phosphate, tricresyl phosphate or other plasticizer for the finished resin, over-condensation to an insoluble infusible resin is readily prevented and moreover the whole reaction is much more readily controlled. This process of preventing over-condensation may be used in the manufacture of any synthetic resins which can be condensed to the infusible insoluble state.

Most of the so-called camphor substitutes which have been proposed or are in use in the nitro-cellulose industry and in the general industry of cellulose esters and ethers are also capable of plasticizing the synthetic resins with which the present invention is concerned. However in the choice of a plasticizer for use in controlling the condensation, it is desirable that the plasticizing agent selected should not itself be capable of taking part in the condensation. Compounds which I have found particularly valuable for the purpose are the phosphates of phenols or naphthols or their homologues or substitution products including the halogenated phenolic bodies, e. g. triphenyl and tricresyl phosphates, and the other phenolic plasticizers mentioned above. It is particularly desirable to use a plasticizer which is subsequently to form part of the polymerized vinyl composition.

The quantity of plasticizing agent used in the condensation may vary very considerably and I have found that very good results are obtained by using a quantity of plasticizer varying from one enghth the weight of the resin to be formed or of the intermediate resin body employed for the reaction up to twice the weight of the said resin. Inasmuch as the plasticizing agent is intimately mixed with the final resin product it will be seen that the particular application to which the resin-plasticizing agent complex is to be put determines to some extent the amount of plasticizer which is to be used, though it is to be noted that the plasticizing agent may if desired be removed from the resin after the reaction or its quantity may be reduced.

It is not essential that the condensation or polymerization should be carried out in presence of the exact amount of plasticizer which it is desired to use in the composition, since plasticizer may be removed from the final resin or further plasticizer may be added either together with or separately from other additions which may be made.

The following examples illustrate the manufacture of synthetic resins in accordance with this special process.

*Example 1*

| | Parts |
|---|---|
| Commercial cresol | 220 |
| 40% formaldehyde solution | 180 |
| Phosphoric acid | 1 |
| Tricresyl phosphate | 100 | are heated under reflux in a jacketed vessel by means of steam or oil at 110° C. until a soft resin is formed. The soft resin is washed with water and distilled in vacuo until the resin gives a very slightly cloudy solution in acetone. The excess reagents are removed during this distillation and there remains a clear resin which is hard when cold.

*Example 2*

| | Parts |
|---|---|
| Crude diphenylol propane | 320 |
| 40% formaldehyde solution | 128 |
| Phosphoric acid | 1 | are heated under reflux in a jacketed vessel by means of steam or oil at 110° C. for 10 to 12 hours or until a resin is formed which is hard and brittle at ordinary temperatures. The resin is washed with boiling water to remove most of the catalyst and excess reagents, but should not be continued sufficiently to produce an over-condensation to the insoluble and infusible stage. Usually three hours' washing suffices and when excess wash water is removed the resin is a white to yellow opaque solid containing approximately 20% of water. To this batch of resin 64 lbs. of tricresyl phosphate are added and the mixture heated preferably with stirring and either in vacuo or in an open vessel until no more water is driven off. The fused mass is then raised to about 130 to 160° C. and kept at this temperature until a sample shows a slightly cloudy solution in acetone. It is then run off and allowed to cool.

Though for the purpose of the present invention polymerized vinyl acetate has been more specifically referred to above, other polymerized vinyl compounds may be employed, and the invention may be said to contemplate broadly the application of compounds which may be considered to be derivatives of polymerized vinyl alcohol and its homologues and substitution products in which the hydroxy groups are substituted by groups which lend to the vinyl compound resistance to water, as for example ester or ether groups. All such compounds are in the claims included in the generic expression polymerized vinyl compounds. I prefer to employ ester groups of organic acids, for example organic acids of the aliphatic series, such as acetic acid, chloracetic acid or propionic acid and the like or of the aromatic series, such as benzoic acid, and again, it is preferable that the ester groups should not contain free hydroxy or free carboxy groups. Thus polymerized vinyl esters of mono carboxylic acids containing no hydroxy groups are very suitable for the purpose of the present invention. Similarly it is preferred to employ polymerized vinyl ethers in which the ether groups do not contain free hydroxy or carboxy groups.

The compositions described above may be applied to the tapes, ribbons, films, sheets or fabrics of the cellulose acetate or other cellulose esters or ethers in any suitable manner and in a more or less molten or dissolved form.

The base fabric, tape or the like may and preferably does consist wholly of the cellulose ester or ether, though the invention does include applying the compositions to mixed goods containing a cellulose ester or ether, in association with other materials, as for example cotton, viscose or other regenerated cellulosic material. The cellulose ester or ether employed as base fabric, film, etc. may be in any desired stage of hydrolysis or ripening. For example an acetone soluble or a chloroform soluble cellulose acetate may be employed. Other cellulose esters include cellulose formate, propionate or butyrate or methyl, ethyl or benzyl cellulose. It is preferable, particularly for insulation purposes, not to employ derivatives in which the ester or ether groups contain free hydroxy or carboxy groups.

The actual application of the composition of the tape, film, fabric or the like may take place in a number of ways. If the composition be sufficiently fluid, as for example by inclusion therein of volatile solvents, it may be applied to the take, fabric, film or the like by spraying or brushing methods, sufficient of the composition being preferably applied to fill completely interstices between the threads of the tape or fabric. Alternatively the tape, ribbon, film, fabric or the like may be passed directly through a bath containing the molten or dissolved composition, and any excess removed, if desired or requisite, by suitable means, as for example by passing the yarn through a die or by passing a film, ribbon, fabric or the like in contact with a doctor-blade adapted to remove the excess. A further method consists in extruding the compositions on to or around the travelling yarn, tape, fabric, etc. For example a yarn containing a number of filaments may be passed through an annular stream of the composition which is thus applied in a continuous manner. Again, slits or other suitably shaped orifices may be used to extrude a band of the composition on to a travelling tape, film, ribbon or fabric. Preferably, such a slit is arranged on each side of the fabric or other material being coated so as to cover thoroughly both sides of the fabric or material.

For the purpose of obtaining a strip of insulating material it is not necessary to use an already formed fabric, since a warp of threads, say thousands of threads aligned side by side, or a relatively limited number of threads close together may be doped with the composition so that upon drying they adhere to each other and form a fabric or tape. If desired, such a warp or such a collection of individual threads may be held together at more or less long intervals by suitable wefts. In the case of applying the compositions to artificial products and fabrics, as for example fibres produced from viscous or better from organic substitution derivatives of cellulose, e. g. from cellulose acetate filaments produced by the dry spinning process, such a process may be applied directly to the filaments or yarns continuously with their production. Thus for example a number of yarns of associated filaments, with or without twist, may be aligned and doped with the compositions as described, or alternatively the individual filaments may be aligned, as for example those proceeding from a line type of jet, and doped directly so that the whole adhere together.

The invention further contemplates the doping of individual filaments or individual yarns, so that they do not adhere together, and the product may then be used directly in place of natural silk for winding conductors. A further alternative consists in coating a conductor by means of the dissolved or molten composition and then wrapping or otherwise applying a tape, fabric or the like. The whole may then, if desired, be warmed to allow the fabric to sink into the vinyl composition. Again, the composition may be applied directly to a conductor allowed to dry, and the conductor may then be wrapped with a tape, fabric or the like and finally doped with the composition. Further, the conductor may be wound first with cellulose acetate or other suitable fabric or tape and finally doped with the composition.

Where relatively heavy coatings are to be applied to the tapes, ribbons, films or other base materials it is desirable to apply a number of relatively thin coatings and to dry each coating before the application of the next coating.

In order to obtain uniform insulating properties with any given composition, it is important to standardize the drying operation which follows the application of a polymerized vinyl composition in conjunction with a small or large quantity of a volatile solvent. I have found in fact that it is highly desirable indeed to dry at an elevated temperature for a considerable period and especially for some hours. I have found that a drying effected at 100–120° C. for 3 to 4 hours yields very satisfactory results.

As already indicated, the impregnated articles, such as impregnated tapes, films, ribbons and fabrics are most valuable in their application to electrical insulation purposes. However, numerous other applications are possible in as much as I find that the high flexibility of the doped fabrics or other materials produced according to the present invention, coupled with their high resistance to humid conditions render them suitable for other purpses, and particularly purposes in which high resistance to corrosion and high resistance to the attack of water or humid conditions come into consideration. Thus for example the doped fabrics, sheets or films may be used for wrapping paper or for purposes to which oiled silk goods are at present applied, as for example for tobacco pouches or for linings therefor, or for bandaging purposes. Individual yarns doped with the compositions may be used as gut for tennis rackets.

The present invention further includes laminating the doped fabrics or other materials so as to obtain a more or less thick composite product. Thus for example 6–12 or even more layers of doped fabric may be applied to each other before or after drying of the polymerized vinyl composition, and may be caused to adhere under heat and/or pressure. In the actual wrapping of cables or like electrical conductors, it is desirable to apply a number of layers of doped fabric, tape or the like to the conductor and then to apply heat or pressure so as to cause the separate layers to adhere to each other. The application of heat and pressure may be achieved in the known process of covering the cable with a lead sheath, which in some applications, as for example for submarine or subterranean cables, is desirable. In such laminated products the heat and pressure may be sufficient to cause the product to appear homogeneous. A laminated product obtained by causing adhesion between a number of thicknesses of doped fabric or other material may be applied, especially where transparent products are produced, for motor-car wind screens and windows and the like. Further, the doped material and preferably the laminated product obtained from a number of sheets of such material may be applied to the manufacture of laminated glass using either ordinary window or plate glass, or if desired silica glass or glass of high silica content. The laminated product may be placed, with or without previous softening, between sheets of glass, which may, if desired, receive a previous coating of cellulose acetate, cellulose nitrate, gelatin or other suitable adhesive, though this is not necessary, and the whole pressed together to form the reinforced glass.

While a number of applications of the doped fabrics, films, ribbons, tapes and other products obtained therefrom have been given above, it will be readily apparent that this list of applications is by no means exhaustive, and the present invention, in addition to including the doped products, includes all applications of the same.

The accompanying drawing illustrates an electrical conductor insulated with a material comprising an organic derivative of cellulose fabric impregnated with a composition containing a polymerized vinyl compound and a plasticizer according to the present invention.

The following examples illustrate the application of polymerized vinyl compositions to fabrics and the like for use for insulating purposes according to the invention but they are not to be considered as limiting the invention in any way:—

*Example 3*

A cellulose acetate woven fabric weighing 1.8 to 2 ozs. per square yard is coated with the following composition:—

| | Parts |
|---|---|
| Polymerized vinyl acetate | 100 |
| Diphenylol propane formaldehyde synthetic resin | 45 |
| Tricresyl phosphate | 65 |
| Alcohol | 940 |
| Acetone | 60 | so as to give a weight of dope of from 2 to 3 ozs. per square yard. The doped fabric is then dried in air at room temperature for a considerable period or preferably at 100 to 120° C. for 1 to 5 hours. It is then cut up into strips for winding electrical conductors in known manner. The windings on the conductor may be caused to coalesce by application of heat or by application of solvents. Solvents, however, are less advantageous. The insulated conductor, for example an insulated cable, may if desired be covered with a lead sheath and subjected to the action of heat while enclosed in the lead sheath. The sheath may then be removed. The composition may be similarly applied to a cellulose acetate knitted fabric, for example a lock-knit fabric, but in this case it is desirable to apply a weight of dope of 5 to 10 ozs. per square yard.

Example 4

A composition consisting of:—

| | Parts |
|---|---|
| Polymerized vinyl acetate | 100 |
| Diphenylol propane formaldehyde synthetic resin | 40 |
| Shellac | 60 |
| Tricresyl phosphate | 120 | is dissolved in a suitable solvent, for example that indicated in Example 3, and applied to a fabric as described in Example 3.

Example 5

A composition consisting of:—

| | Parts |
|---|---|
| Polymerized vinyl acetate (insoluble in alcohol) | 100 |
| Diphenylol propane formaldehyde synthetic resin | 10 |
| Tricresyl phosphate | 40 | is dissolved in a mixture of 200 parts of acetone and 800 parts of butyl acetate and applied to a cellulose acetate knitted fabric, weighing 3 ozs. per square yard so as to give a weight of 5 to 10 ozs. of dope per square yard. It is then dried and applied for insulating purposes as described in Example 3.

Example 6

A polymerized vinyl compound is prepared from

| | Parts |
|---|---|
| Polymerized vinyl acetate | 100 |
| Diphenylol propane formaldehyde resin-tricresyl phosphate complex prepared as in Example 2 above and containing 25 parts of the resin and 10 parts of the plasticizer | 35 |
| Diphenylol propane | 65 |

The composition is fused at a temperature of 160 to 180° C. and is applied in this form to a cellulose acetate fabric.

Example 7

A composition consisting of:—

| | Parts |
|---|---|
| Polymerized vinyl acetate | 110 |
| Cresol-formaldehyde resin-tricresyl phosphate complex, prepared as described in Example 1 | 90 |
| Tricresyl phosphate | 35 | is dissolved in 1200 parts of alcohol and applied as described above in Examples 3 and 5.

Example 8

A composition consisting of:—

| | Parts |
|---|---|
| Polymerized vinyl acetate | 100 |
| Shellac | 80 |
| Diphenylol propane formaldehyde synthetic resin | 20 |
| Diphenylol cyclohexane | 20 |
| Triphenyl phosphate | 100 |
| Filler (e. g. silica powder) | 20–40 |
| Acetone | 100 |
| Butyl acetate | 900 |

The composition is applied by the methods described in Examples 3 and 5 above. The diphenylol propane formaldehyde synthetic resin may be replaced by a synthetic resin prepared from diphenylol propane and chloracetone.

Example 9

A composition consisting of:—

| | Parts |
|---|---|
| Polymerized vinyl acetate | 100 |
| Triphenyl phosphate | 25 |
| Alcohol | 600 | is applied as described above.

Example 10

A composition consisting of:—

| | Parts |
|---|---|
| Polymerized vinyl acetate | 100 |
| Diphenylol cyclohexane formaldehyde synthetic resin | 60 |
| Crude diphenylol propane | 40 |
| Tricresyl phosphate | 100 |
| Acetone | 200 |
| Alcohol | 600 |
| Butyl acetate | 200 | is used to coat a conductor which has already been wrapped or covered with fabric, tape or the like. The doped covered conductor is dried as previously described.

Example 11

A paper or film of cellulose acetate is coated with any of the compositions described in Examples 3 to 7 above, is dried in a similar manner, cut up into strips and wound upon an electrical conductor.

What I claim and desire to secure by Letters Patent is:—

1. Electrical conductors insulated with a material comprising an organic derivative of cellulose and at least the surface of which contains a composition comprising a polymerized vinyl compound and a plasticizer selected from the group consisting of compounds containing phenolic hydroxy radicles and derivatives of said compounds, wherein the phenolic radicles are esterified or etherified.

2. Electrical conductors insulated with a material comprising an organic derivative of cellulose and at least the surface of which contains a composition comprising a polymerized vinyl compound and a plasticizer selected from the group consisting of diphenylol propane, triphenyl phosphate and tricresyl phosphate.

3. Electrical conductors insulated with a material comprising cellulose acetate and at least the surface of which contains a composition comprising polymerized vinyl acetate and a plasticizer selected from the group consisting of diphenylol propane, triphenyl phosphate and tricresyl phosphate.

4. Electrical conductors insulated with a material comprising an organic derivative of cellulose and at least the surface of which contains a composition comprising a polymerized vinyl compound, a plasticizer selected from the group consisting of diphenylol propane, triphenyl phosphate and tricresyl phosphate and a resin selected from the group consisting of shellac and diphenylol propane-formaldehyde resin.

5. Electrical conductors insulated with a material comprising an organic derivative of cellulose, said material being coated with a composition comprising a polymerized vinyl compound free from uncombined hydroxy or carboxy groups, and a plasticizer selected from the group consisting of the compounds containing phenolic hydroxy radicles and derivatives of said compounds, wherein the phenolic radicles are esterified or etherified.

6. Electrical conductors insulated with a material comprising an organic derivative of cellulose, at least the surface of which contains a composition containing a polymerized vinyl compound, a resin, and a plasticizer selected from the group consisting of compounds containing phenolic hydroxy radicles and derivatives of said compounds, wherein the phenolic radicles are esterified or etherified.

7. Electrical conductors insulated with a material comprising an organic derivative of cellulose, said material being coated with a composition comprising a compound selected from the group consisting of polymerized mono-carboxylic acid esters of vinyl alcohol and polymerized vinyl ethers, wherein the acyl radicle of the esters contains no free hydroxy or carboxy groups, and wherein the radicles attached through oxygen to the vinyl groups in the polymerized vinyl ethers contain no free hydroxy or carboxy groups, and also comprising a plasticizer selected from the group consisting of compounds containing phenolic hydroxy radicles and derivatives of said compounds, wherein the phenolic radicles are esterified or etherified.

8. Electrical conductors insulated with a material comprising cellulose acetate and at least the surface of which contains a composition comprising a polymerized vinyl acetate and a plasticizer selected from the group consisting of compounds containing phenolic hydroxy radicles and derivatives of said compounds, wherein the phenolic radicles are esterified or etherified.

9. Electrical conductors insulated with a material comprising cellulose acetate and at least the surface of which contains a composition comprising a polymerized vinyl acetate, a plasticizer selected from the group consisting of diphenylol propane, triphenyl phosphate and tricresyl phosphate and a resin selected from the group consisting of shellac and diphenylol propane-formaldehyde resin.

10. Electrical conductors insulated with a material comprising cellulose acetate, at least the surface of which contains a composition containing a polymerized vinyl acetate, a resin, and a plasticizer selected from the group consisting of compounds containing phenolic hydroxy radicles and derivatives of said compounds, wherein the phenolic radicles are esterified or etherified.

11. Electrical conductors insulated with a material comprising cellulose acetate, said material being coated with a composition comprising a compound selected from the group consisting of polymerized mono-carboxylic acid esters of vinyl alcohol and polymerized vinyl ethers, wherein the acyl radicle of the esters contains no free hydroxy or carboxy group, and wherein the radicles attached through oxygen to the vinyl groups in the polymerized vinyl ethers contain no free hydroxy or carboxy groups, and also comprising a plasticizer selected from the group consisting of compounds containing phenolic hydroxy radicles and derivatives of said compounds, wherein the phenolic radicles are esterified or etherified.

WILLIAM HENRY MOSS.

CERTIFICATE OF CORRECTION.

Patent No. 2,057,688.  October 20, 1936.

WILLIAM HENRY MOSS.

It is hereby certified that error appears in the printed specification of the above numbered patent requiring correction as follows: Page 2, second column, line 70, for "enghth" read eighth; page 3, second column, line 33, for "of" second occurrence, read to; line 38, for "take" read tape; and that the said Letters Patent should be read with these corrections therein that the same may conform to the record of the case in the Patent Office.

Signed and sealed this 22nd day of December, A. D. 1936.

(Seal)

Henry Van Arsdale
Acting Commissioner of Patents.